(12) United States Patent
Kwon et al.

(10) Patent No.: US 9,043,805 B2
(45) Date of Patent: May 26, 2015

(54) RECONFIGURABLE PROCESSOR AND METHOD

(75) Inventors: Kwon Taek Kwon, Seoul (KR); Kyoung June Min, Yongin-si (KR); Seok Yoon Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 499 days.

(21) Appl. No.: 12/923,487

(22) Filed: Sep. 23, 2010

(65) Prior Publication Data

US 2011/0099555 A1    Apr. 28, 2011

(30) Foreign Application Priority Data

Oct. 23, 2009    (KR) ................... 10-2009-0101151

(51) Int. Cl.
*G06F 9/46* (2006.01)
*G06F 15/78* (2006.01)

(52) U.S. Cl.
CPC ............ *G06F 15/7875* (2013.01); *G06F 9/461* (2013.01); *G06F 9/462* (2013.01)

(58) Field of Classification Search
CPC ....................................................... G06F 9/461
See application file for complete search history.

(56) References Cited

U.S. PATENT DOCUMENTS

| | | | |
|---|---|---|---|
| 6,675,191 B1 * | 1/2004 | Ito | 718/102 |
| 6,799,052 B2 | 9/2004 | Agness | |
| 8,190,795 B2 * | 5/2012 | Hinohara et al. | 710/56 |
| 2002/0098850 A1 | 7/2002 | Akhteruzzaman | |
| 2004/0215720 A1 * | 10/2004 | Alexander et al. | 709/204 |
| 2006/0136915 A1 * | 6/2006 | Aingaran et al. | 718/100 |
| 2006/0252432 A1 | 11/2006 | Gruchala | |
| 2006/0286930 A1 | 12/2006 | Rathus | |
| 2008/0214211 A1 | 9/2008 | Lipovski | |
| 2009/0094437 A1 * | 4/2009 | Fukuda | 712/28 |
| 2009/0100220 A1 * | 4/2009 | Kajigaya | 711/109 |
| 2010/0082951 A1 * | 4/2010 | Bates et al. | 712/228 |
| 2010/0115238 A1 * | 5/2010 | Tsao et al. | 712/205 |
| 2010/0153677 A1 * | 6/2010 | Kim et al. | 711/170 |

FOREIGN PATENT DOCUMENTS

| | | |
|---|---|---|
| KR | 10-2007-0002163 | 1/2007 |
| KR | 10-2007-7011854 | 12/2007 |
| KR | 10-2008-0072457 | 8/2008 |
| KR | 10-2008-0076392 | 8/2008 |
| KR | 10-2009-0020952 | 2/2009 |
| KR | 10-2009-0077963 | 7/2009 |
| KR | 10-2009-0083596 | 8/2009 |

OTHER PUBLICATIONS

International Search Report in PCT/US2010/02597 dated Nov. 15, 2010.
State Prison Uses Technology to Block Inmates' Calls, my601.com, Sep. 8, 2010, pp. 1.
"Operation Cellblock" Shuts Down Illegal Inmate Cell Phone Usage, wlbt.com, Sep. 8, 2010, pp. 1.

* cited by examiner

*Primary Examiner* — Camquy Truong
(74) *Attorney, Agent, or Firm* — NSIP Law

(57) ABSTRACT

Disclosed are a reconfigurable processor and processing method, a reconfiguration control apparatus and method, and a thread modeler and modeling method. A memory area of a reconfigurable processor may be divided into a plurality of areas, and a context enabling a thread process may be stored in respective divided areas, in advance. Accordingly, when a context switching is performed from one thread to another thread, the other thread may be executed by using information stored in an area corresponding to the other thread.

31 Claims, 13 Drawing Sheets

RECONFIGURABLE PROCESSOR AND METHOD

CROSS-REFERENCE TO RELATED APPLICATIONS

This application claims the benefit of Korean Patent Application No. 10-2009-0101151, filed on Oct. 23, 2009, in the Korean Intellectual Property Office, the disclosure of which is incorporated herein by reference.

BACKGROUND

1. Field

One or more embodiments relate to a reconfigurable processor and reconfiguration method, a reconfiguration control apparatus and method, and a thread modeler and modeling method, and more particularly, to a reconfigurable processor and reconfiguration method, a reconfiguration control apparatus and method, and a thread modeler and modeling method, which represent a memory divided into different respective areas corresponding to different available threads to be selectively accessed by processing elements of the reconfigurable processor by performing context switching between threads.

2. Description of the Related Art

Recently, there has been a focus of attention on reconfigurable processors that simultaneously operate a plurality of function units to perform a calculation. A reconfigurable processor may be operated in a Coarse Grain Array (CGA) mode to execute a loop related to an iterative operation. In the CGA mode, the plurality of function units (FUs) simultaneously operate to perform a corresponding calculation, thereby improving a performance related to the calculation.

When a stall occurs while the calculation is performed using the reconfigurable processor, the reconfigurable processor may hide a thread where the stall occurs in another memory and may embody multi-threading by performing context switching. However, the duration of the stall is about 5 to 100 cycles, whereas a cycle required for performing context switching conventionally exceeds the duration of the stall, and thus, effective multi-threading may not be embodied.

SUMMARY

According to one or more embodiments, an area of a memory of a reconfigurable processor may be divided into a plurality of areas, and a context enabling a thread process may be stored in each of the divided areas in advance. The reconfigurable processor may perform context switching to another thread from a current thread by using information stored in an area corresponding to the other thread.

In other words, configuration information about a function unit may be loaded to a configuration memory, and an input value enabling the thread loaded to each area of the global register in advance, thereby preventing overhead during the context switching. Accordingly, the threading may be performed by context switching that is not accompanied by an overhead cycle, as it is found that to effectively utilize the duration of the stall, an overhead cycle required for a context switching operation is desirably close to zero.

Also, according to one or more embodiments, another thread is performed during stall cycles of a reconfigurable processor, thereby improving processing speeds.

According to one or more embodiments, there is provided a reconfigurable processor including a plurality of memories divided into a plurality of different areas, the different divided areas corresponding to respective different threads from a plurality of threads, with corresponding areas of the different divided areas storing context information of the respective different threads, and a plurality of function units to perform a corresponding calculation based on received context information stored in an area, from the different divided areas, corresponding to a respective thread indicated to be executed.

According to one or more embodiments, there is provided a reconfiguration control apparatus including a reconfigurable processor having a plurality of memories divided into a plurality of different areas, the different divided areas corresponding to respective different threads from a plurality of threads, and to store context information of the respective different threads in corresponding areas of the different divided areas, and a controlling unit to control a storing of the context information of the respective different threads in the corresponding different divided areas.

According to one or more embodiments, there is provided a reconfiguration control method including dividing a plurality of memories included in a reconfigurable processor into a plurality of different divided areas corresponding to respective different threads from a plurality of threads, and storing context information of the respective different threads in corresponding areas of the different divided areas.

According to one or more embodiments, there is provided a thread modeling method including calling a plurality of Kernel functions, and setting input datasets corresponding to the plurality of Kernel functions as respective threads, respectively, and performing context switching from a thread of the respective threads currently set to be executed to another thread of the respective threads, and executing the other thread upon a stall occurring with respect to the thread of the respective threads currently set to be executed.

According to one or more embodiments, there is provided a thread modeling method including calling a Kernel function, and dividing input datasets corresponding to the called Kernel function, setting the divided input datasets as respective threads, and performing context switching from a thread of the respective threads currently set to be executed to another thread of the respective threads corresponding to an input dataset of the divided input datasets different from an input dataset set as the thread currently set to be executed, and executing the other thread upon a stall occurring with respect to the thread of the respective threads currently set to be executed.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
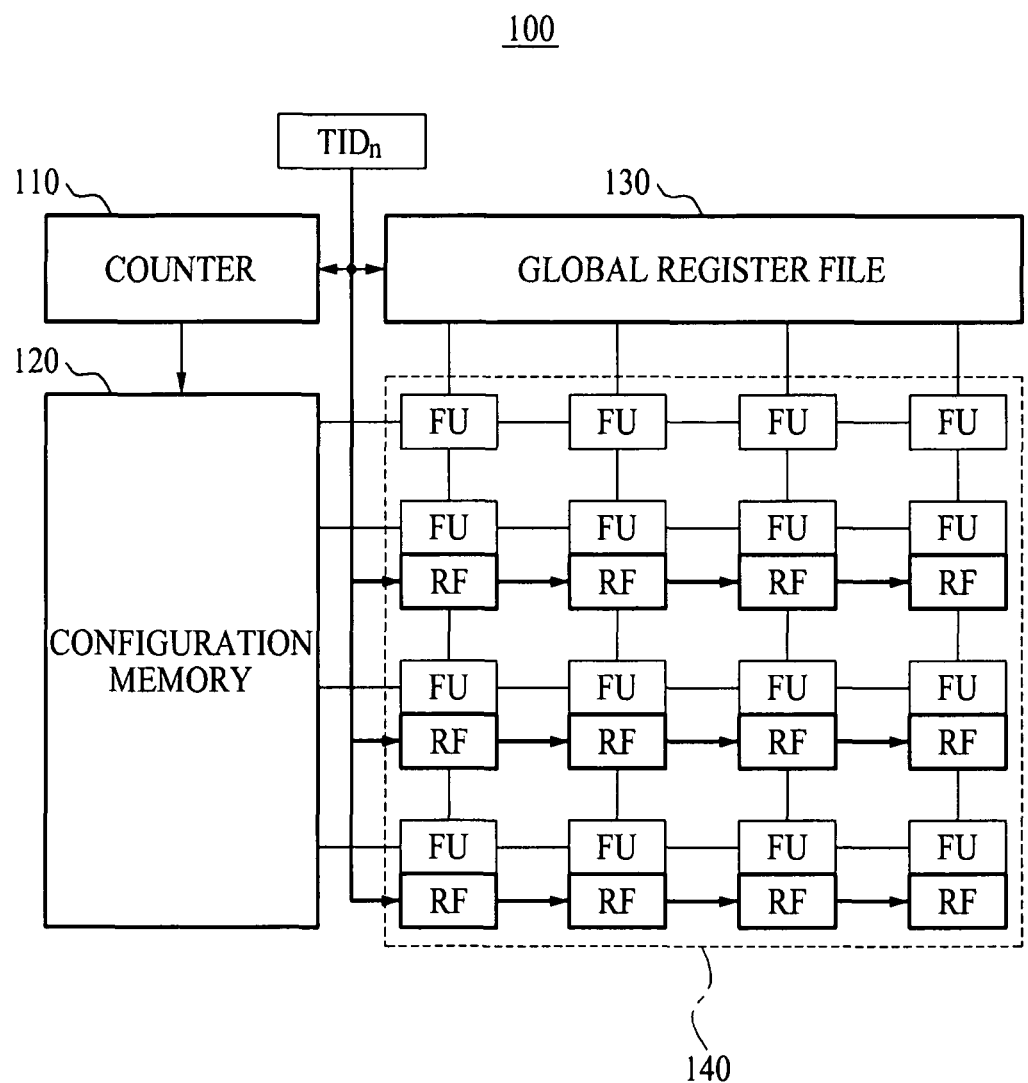
FIG. 1 is a diagram illustrating a reconfigurable processor, according to one or more embodiments.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates a reconfigurable processor 100, according to one or more embodiments.

In FIG. 1, the reconfigurable processor 100 may include a counter 110, a configuration memory 120, a global register file 130, and a configuration array 140, for example.

The counter 110 may increase a count for each cycle, when a loop of a program begins. When the count is increased, the configuration memory 120 may provide data of a corresponding cycle, as an example, an instruction, to a corresponding function unit (FU).

Figure 2:
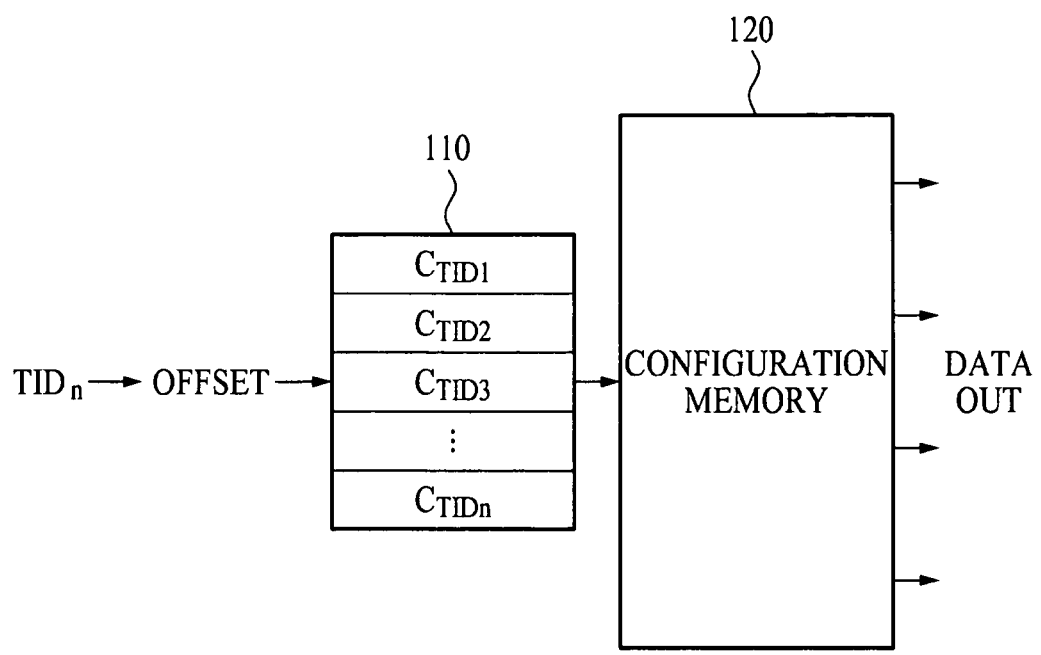
FIG. 2 is a diagram illustrating a counter, according to one or more embodiments.

Referring to FIG. 2, the counter 110 may be divided into a first area through an $n^{th}$ area, namely, $C_{TID1}$, $C_{TID2}$, ..., $C_{TIDn}$. Here, n may be a constant number. The areas $C_{TID1}$, $C_{TID2}$, ..., $C_{TIDn}$ may be mapped to identifications (IDs) of threads, namely, thread IDs TID1, TID2, ..., TIDn, respectively. In other words, in an embodiment, the counter 110 may be divided into areas, a number of the areas being the same as a number of the threads. That is, the areas of the counter 110 may have different TIDs from each other or may have different identification information that is mapped to the different TIDs from each other. Accordingly, the counter 110 that is divided into the areas may count a cycle for each thread. In the same manner, a similar division may be also applied with respect to a global register file 130 and one or more local register file (RFs) of the configuration array 140.

As an example, when a first thread is being computed, the counter 110 may perform counting of a cycle of the first thread in an area $C_{TID1}$ that is corresponding to a TID1 that is an ID of the first thread. Also, when an execution command to execute a second thread is input or a TID2 that is an ID of the second thread is input, the counter 110 may perform counting of a cycle of the second thread in an area $C_{TID2}$ that is corresponding to the TID2.

Referring to FIG. 1, a plurality of memories may include the global register file 130 and one or more local RFs of the configuration array 140. An area of the memories may be divided into a plurality of areas to be corresponding to a plurality of threads, and each of the areas may store context information of a corresponding thread. Hereinafter, the global register file 130 and the one or more local RFs in the memories will be separately described.

The configuration memory 120 may store information about a configuration of the configuration array 140. The information about the configuration may be a bit or a control signal which indicates a calculation, an operation, a status, and the like of each of the processing elements. In an embodiment, each of the processing elements my be represented by a single FU or a paired FU and local RF, as shown in the configuration array 140 of FIG. 1. The processing elements of the configuration array may execute a loop operation or another calculation by using information transmitted from the configuration memory 120. The information may include an instruction generated for each cycle, the instruction being generated when a compiler compiles a loop statement of a program. Therefore, a calculation performed by one or more FUs may be determined based on information stored in the configuration memory 120.

Also, the configuration memory 120 may provide, to a corresponding FU, information enabling execution of a thread, based on a result of the counting performed by the counter 110. In other words, the configuration memory 120 may provide, to the configuration array 140, information corresponding to an area $C_{TIDn}$ that is currently counted by the counter 110. As an example, when $C_{TID1}$ of the counter 110 performs counting of a cycle, the configuration memory 120 may provide information corresponding to the first thread TID1, namely, an instruction, to the configuration array 140.

Figure 3:
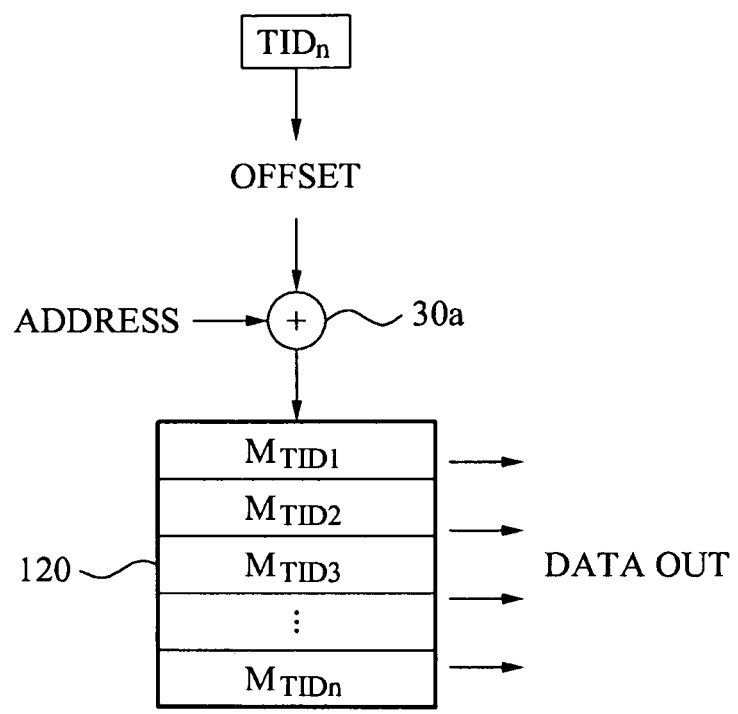
FIG. 3 is a diagram illustrating a configuration memory, according to one or more embodiments.

FIG. 3 illustrates a configuration memory, according to one or more embodiments.

Referring to FIG. 3, the configuration memory 120 may be divided into a first area through an $n^{th}$ area, namely, $M_{TID1}$, $M_{TID2}$, ..., $M_{TIDn}$. The areas $M_{TID1}$, $M_{TID2}$, ..., $M_{TIDn}$ may be mapped to a plurality of threads TID1, TID2, ..., TIDn, respectively. In an embodiment, configuration information corresponding to each of the threads that is generated after compiling may be loaded from an external memory and may be stored in a corresponding area of the areas $M_{TID1}$, $M_{TID2}$, ..., $M_{TIDn}$. Accordingly, when an execution of the $n^{th}$ thread TIDn is requested, configuration information corresponding to the TIDn may be provided from the $M_{TIDn}$ to one or more FUs of the configuration array 140.

As an example, when a first thread TID1 is being computed, the configuration memory 120 may provide, to the configuration array 140, information corresponding to the first thread from an $M_{TID1}$ that is an area corresponding to the TID1. Also, when an ID of a second thread TID2 is input through an adder 30a and thereby commands an executing of the second thread, the configuration memory 120 may provide information corresponding to the second thread from the $M_{TID2}$ that is an area corresponding to the TID2.

When the counter 110 is not divided as illustrated in FIG. 2, the configuration memory 120 may be divided as illustrated in FIG. 3. In addition, when the counter 110 is divided as illustrated in FIG. 2, the configuration memory 120 may or may not be divided.

Figure 6:
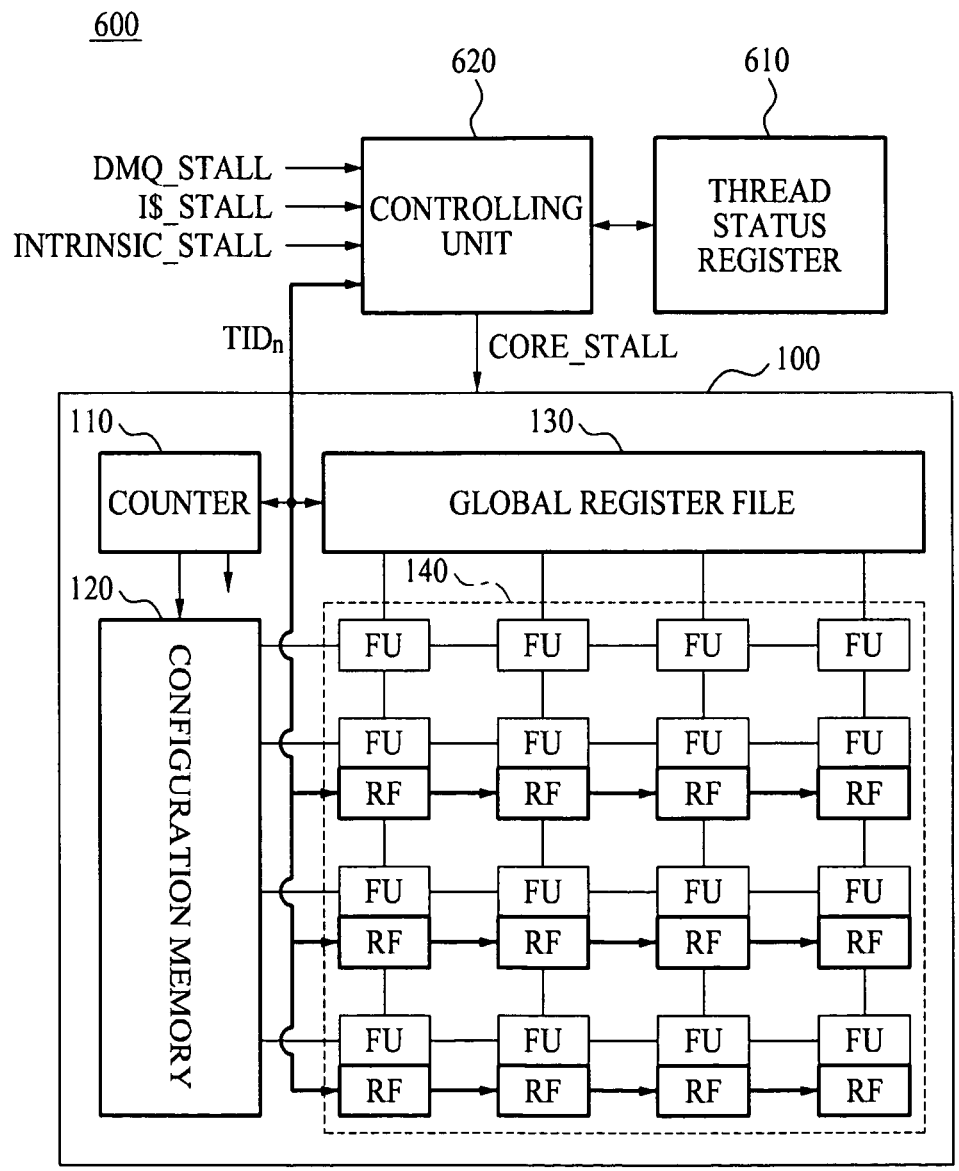
FIG. 6 is a block diagram illustrating a reconfiguration control apparatus, according to one or more embodiments.

Referring again to FIG. 1, the configuration array 140 and a controlling unit, such as the controlling unit 620 shown in FIG. 6, may mutually share the global register file 130 that is applied as one of the plurality of memories. The global register file 130 may receive an input value from the controlling unit 620 to provide the input value to an FU or may receive an output value of the calculation performed by the FU to provide the output value to the controlling unit 620. Also, the global register file 130 may receive, from the controlling unit 620, identification information TIDn of a thread to be executed, and may allow the FU to access an area mapped to the identification information.

Accordingly, when an execution of the $n^{th}$ thread TIDn is requested, the global register file 130 may provide, to a plurality of FUs, an input value that is loaded to an area $L_{TIDn}$ corresponding to the TIDn.

Figure 4:
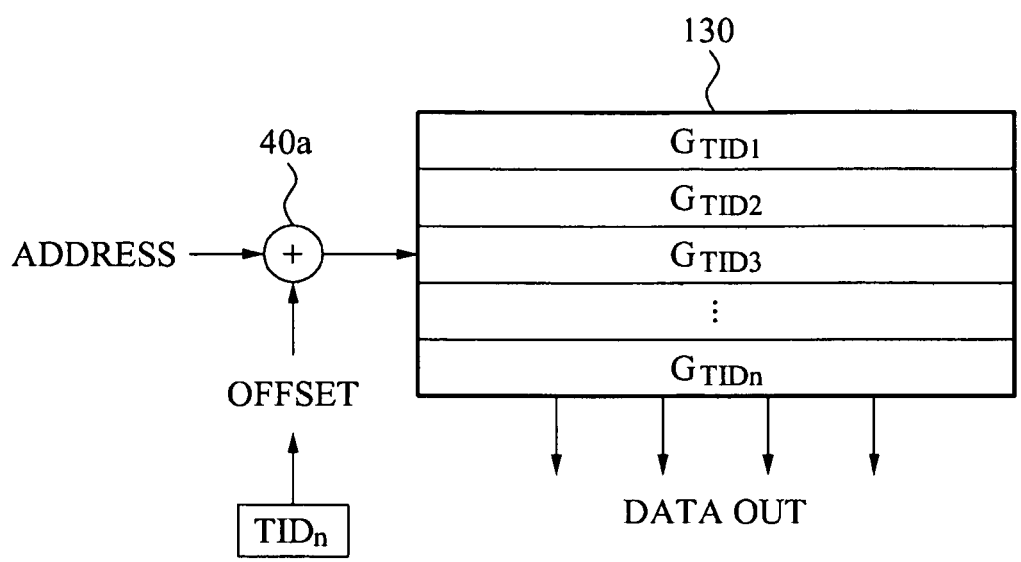
FIG. 4 is a diagram illustrating a global register file, according to one or more embodiments.

FIG. 4 illustrates a global register file, according to one or more embodiments. Referring to FIG. 4, the global register file 130 may be divided into a first area through an $n^{th}$ area, namely, $G_{TID1}, G_{TID2}, \ldots, G_{TIDn}$. The plurality of areas $G_{TID1}, G_{TID2}, \ldots, G_{TIDn}$ may be mapped to a plurality of threads TID1, TID2, TIDn, respectively. Each of the plurality of areas $G_{TID1}, G_{TID2}, \ldots, G_{TIDn}$ may include a register corresponding to each of the plurality of threads, the register either being loaded from the configuration memory 120 or from an external memory, for example.

As an example, when an execution command to execute a second thread TID2 or an ID of the second thread TID2 is input through an adder 40a, the global register file 130 may provide, to the configuration array 140, an input dataset corresponding to the second thread TID2, namely an input value, from an area $G_{TID2}$ corresponding to the TID2.

Referring to FIG. 1, the configuration array 140 may include a plurality of FUs and a plurality of local register files (RFs). As noted, as only an example, a single FU and a single local RF may constitute a single pair, and a single processing element may include both the FU and the local RF or may include only the FU.

The configuration array 140 may change connections between processing elements included in the configuration array 140 based on the instruction or the information stored in the configuration memory 120. Also, the configuration array 140 may define a function of a corresponding FU based on a configuration or the instruction stored in the configuration memory 120.

The corresponding FU may receive context information from an area corresponding to a thread to be executed, among the plurality of areas as illustrated in FIGS. 2 through 5, and may perform an appropriate calculation. When identification information of the thread to be executed, as an example, a TID1, is input from the controlling unit 620, the corresponding FU may perform the calculation by using context information stored in an area that is mapped to the identification information.

When identification information of another thread, as an example, a TID2, is input from the controlling unit 620, the corresponding FU may stop execution of the thread TID1 and perform the appropriate function by using context information stored in an area that is mapped to the identification information TID2 of the other thread.

The local RFs may each be a set of registers, and may store data used by the respective FUs or an output value of the respective FUs, for example.

Figure 5:
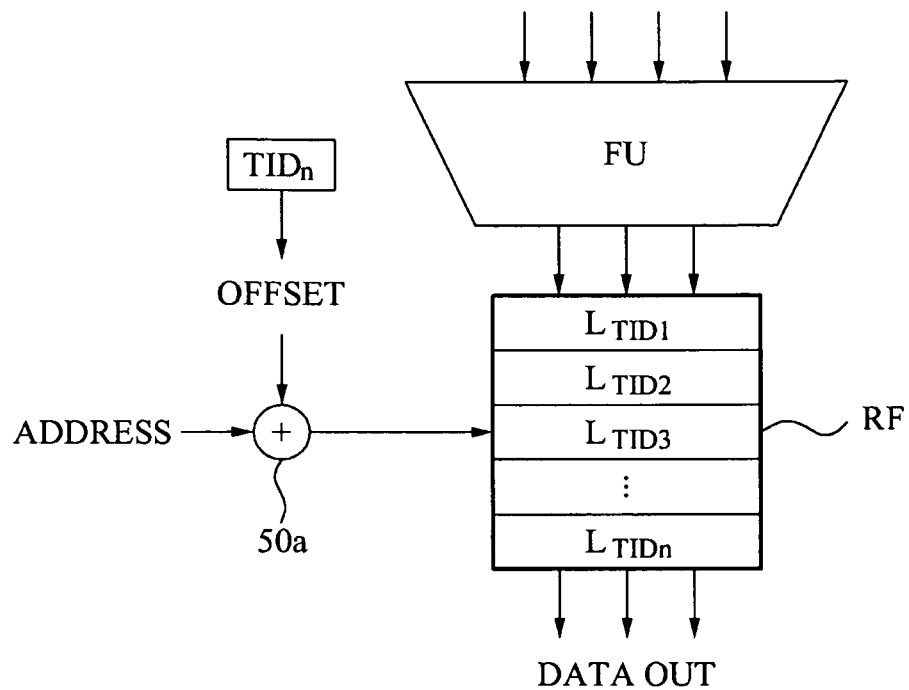
FIG. 5 is a diagram illustrating a local register file, according to one or more embodiments.

FIG. 5 illustrates a local RF according to one or more embodiments. As noted above, in an embodiment and only as an example, the corresponding local RF may be paired with a particular FU, e.g., such that each of plural FUs has a respective paired local RE.

Referring to FIG. 5, each local RF may be divided into a first area through an $n^{th}$ area, namely, $L_{TID1}, L_{TID2}, \ldots, L_{TIDn}$. The areas $L_{TID1}, L_{TID2}, \ldots, L_{TIDn}$ may be mapped to threads TID1, TID2, . . . , TIDn, respectively. A register corresponding to each of the threads may be loaded to a corresponding area of the areas $L_{TID1}, L_{TID2}, \ldots, L_{TIDn}$ or an output value of a corresponding FU may be stored in each corresponding area of the areas $L_{TID1}, L_{TID2}, \ldots, L_{TIDn}$.

As an example, when a first thread TID1 is being computed, the local RF may store, in an area $L_{TID1}$ corresponding to the TID1, an output value corresponding to the first thread TID1. Also, when an execution command of the second thread TID2 is input or an ID TID2 of the second thread is input through an adder 50a, the local RF may store an output value corresponding to the second thread TID2 in an area $L_{TID2}$ corresponding to the TID2.

FIG. 6 is a block diagram illustrating a reconfiguration control apparatus 600, according to one or more embodiments.

The reconfiguration control apparatus 600 of FIG. 6 may include a configuration array and may operate in a configuration array mode.

First, in an embodiment, when a compiler compiles a program source code including a loop that is capable of being Coarse Grain Array (CGA) kernelized, at least one thread, a configuration code, a thread launch stub code, an instruction code, and Block Started by Symbol (BSS) data, e.g., an uninitialized data segment, may be generated.

The configuration code may be a code to be loaded to the configuration memory 120 to execute the configuration array mode, as an example, a CGA mode.

The thread launch stub code may be a command code that performs preparations enabling the configuration array mode, immediately prior to performing a kernel during execution of a program. When the reconfiguration control apparatus 600 is operated in the CGA mode, the kernel may be a CGA kernel. The thread launch stub code may initialize a thread status register 610 and the controlling unit 620, and may set each area of divided register files 130 and one or more local RFs to be mapped to a corresponding thread of the plurality of threads.

The instruction code is a command code to execute others excluding the kernel, as an example, a CGA kernel, used in the configuration array mode. The BSS data may include a global static variable defined in the program, constant data, and the like.

The compiled program may be stored in an external memory, for example. After the compiling, the program may be loaded to the reconfigurable processor 100 before execution of the program is started. A process of loading the program may be as follows.

The reconfigurable processor 100 may include an interface connected to an external bus, and may perform transmission and reception of data between the configuration memory 120, an instruction memory, a data memory, and an external memory, for example.

The configuration code may be loaded to the configuration memory 120 in the reconfigurable processor 100 through the interface.

The thread launch stub code and the instruction code may be loaded to the instruction memory, e.g., when the instruction memory is included in the reconfigurable processor 100. Conversely, when the instruction memory exists outside the reconfigurable processor 100, a separate loading process may not be performed.

The BSS data may be loaded to a data memory in the reconfigurable processor 100 through the interface, when the program is loaded.

According to the described description, in the loading process of the program, data may be loaded only to the configuration memory 120.

In an embodiment, when the loading is completed, the thread launch stub code may be executed immediately prior to the execution of the program is started, namely, immediately prior to the configuration array mode begins. Accordingly, the thread status register 610 and the controlling unit 620 are initialized, and each area of the counter 110 potentially being divided into a plurality of areas, the global register file 130 potentially being divided into a plurality of areas, and the local RFs potentially being respectively divided into a plurality of areas, may be set as data mapped to a corresponding thread.

Referring to FIG. 6, the reconfiguration control apparatus 600 may include the thread status register 610, the controlling unit 620, and the reconfigurable processor 100. Since the reconfigurable processor 100 illustrated in FIG. 6 may be similar to the reconfigurable processor 100 described with reference to FIG. 1, further detailed description thereof will be omitted. However, the reconfigurable processor 100 may include a plurality of memories, including the global register file 130 and one or more local RFs of the configuration array 140 that are each divided into a plurality of areas to be corresponding to a plurality of threads.

The thread status register 610 may be initiated before the configuration array mode begins, and may store an initial status of a thread or a changed status of the thread when the configuration array mode begins. The status may include a runnable status indicating that the thread is available, a stall status indicating that a stall occurs in the thread, a stall release status indicating that a stall is released, and a complete status indicating that execution of the thread is completed.

The stall is caused when a value enabling a FU to execute a calculation is not set. When the stall occurs, the FU may not execute a corresponding thread and may stay in a dormant status.

A type of stall may include a DMQ stall (dmq_stall), an intrinsic stall (intrinsic_stall) and an instruction stall (I$_stall), for example. The DMQ stall (dmq_stall) may occur when a required value is not loaded and is not stored from the global register file 130 or a local RF, for example. The intrinsic stall may occur when a calculation that is greater than a relatively simple calculation performed by the FU is input to the FU. The instruction stall may occur when a miss occurs in an instruction cache.

Also, a core stall (Core_stall) that is generated by the controlling unit 620 may occur in a general kernel as opposed to in a loop statement.

When a loop occurs during compiling, the controlling unit 620 may divide an area of the global register file 130 and one or more local RFs into a plurality of areas, a number of the areas being same as a number of threads, for example. Also, the controlling unit 620 may set each of the divided areas of the divided register file 130 and the one or more local RFs to be mapped to a corresponding thread. As an example, the controlling unit 620 may assign an ID corresponding to a corresponding thread to each of the divided areas. As illustrated in FIG. 2, the counter 110 may assign a corresponding ID, such as a $C_{TID1}$ corresponding to a first thread TID1, a $C_{TID2}$ corresponding to a second thread TID2, and the like, to each area. In this instance, the number of threads may be known from the compiling process.

Also, a number of the divided areas of the counter 110, the global register file 130, and the one or more local RFs may be fixed during a manufacturing process or may be changed by the controlling unit 620.

The controlling unit 620 may perform preparations for a configuration array mode before the configuration array mode begins. That is, the controlling unit 620 may load/store context information, of a corresponding thread to be mapped, to each of the divided areas of the register file 130 and the one or more local RFs. As an example, the controlling unit 620 may store, in the global register file 130, input dataset to be processed, provide the corresponding register to the global register file 130, or provide configuration information enabling the execution of the thread to a processing element, e.g., an FU or FU and local RF pair.

The controlling unit 620 may set a status of all threads to an executable status, when the configuration array mode begins. Operation in the configuration array mode may indicate execution of a CGA kernel.

The controlling unit 620 may change the status of the corresponding thread that is set to the thread status register 610, when the status of the thread is changed during the operation in the configuration array mode. As an example, when a stall occurs during the execution of the first thread TID1, the controlling unit 620 may set the status of the first thread TID1 as a "stall status", and when the stall is released, may set the status as a "stall release status". Also, when the execution of the first thread TID1 is completed, the status may be set as a "stall completion status".

Also, the controlling unit 620 may select a thread to be currently executed from among a plurality of available threads to command execution, and may provide an address corresponding to the selected thread to the selected adders 40a and 50a. Also, the controlling unit 620 may provide a TIDn that is an ID of the selected thread to the counter 110 and the adders 40a and 50a.

Also, as another example, the controlling unit 620 may provide the TIDn to adders 30a, 40a, and 50a of the configuration memory 120 as illustrated in FIG. 3. The counter 110 may perform counting of a cycle of a thread in an area $C_{TIDn}$ corresponding to the input TIDn.

Hereinafter, it is assumed that the selected thread is the first thread, and the controlling unit 620 provides the TID1.

When an address is input to the adder 40a, the TID1 performs as an offset and is added to the address in the adder 40a. Accordingly, the global register file 130 and one or more local RFs may select an area $G_{TID1}$ corresponding to the TID1, and may read desired information by accessing a corresponding address in the selected area $G_{TID1}$.

When the address is input into the adder 50a, the TID1 is performed as an offset and is added to the address in the adder 50a. Accordingly, a local RF may select an area $L_{TID1}$ corresponding to the TID1, and may store an output value of the corresponding FU in the selected area $L_{TID1}$.

When a stall occurs after the first thread is selected and execution command is provided, the controlling unit 620 may change a status of the first thread into "stall status" and store the status in the thread status register 610. Also, the controlling unit 620 may check the thread status register 610 to perform context switching. That is, the controlling unit 620 may select another available thread and may command execution of the selected other thread.

As an example, when a second thread is selected as the other available thread, the controlling unit 620 may provide a TID2 to the counter 110 and adders 40a and 50a, thereby enabling the context corresponding to the second thread to be loaded to the global register file 130 and the local RF.

In this instance, the reconfigurable processor 100 may execute the second thread by using information of the second thread that is loaded to each of the global register file 130 and the one or more local RFs, and thus, acceleration of the loop may be promptly performed. Particularly, a conventional process of storing information of the first thread where the stall occurs in another memory and then reading information of the second thread may not be needed, and thus, a prompt context switching is possible without expending a cycle.

When all the threads included in the loop are completed based on the described processes, the controlling unit 620 may complete the configuration array mode. That is, controlling unit 620 may finish a CGA kernel mode, and may perform switching to a general operation mode such as a Very-Long instruction word (VLIW) mode.

Figure 7:
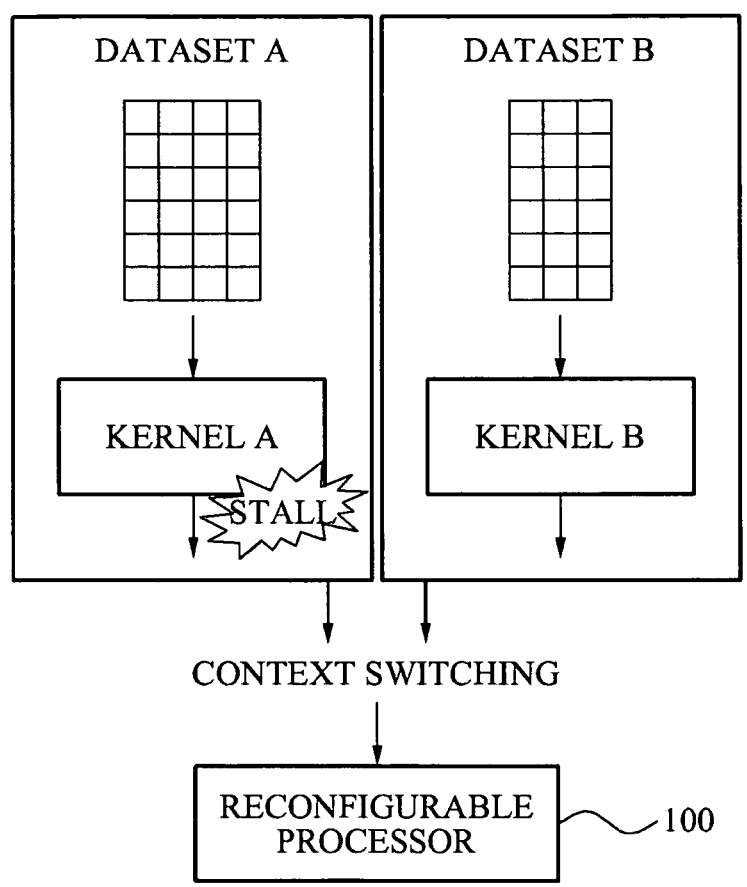
FIG. 7 is a diagram illustrating a thread model for performing multi-threading of multiple kernels, according to one or more embodiments.
Figure 8:
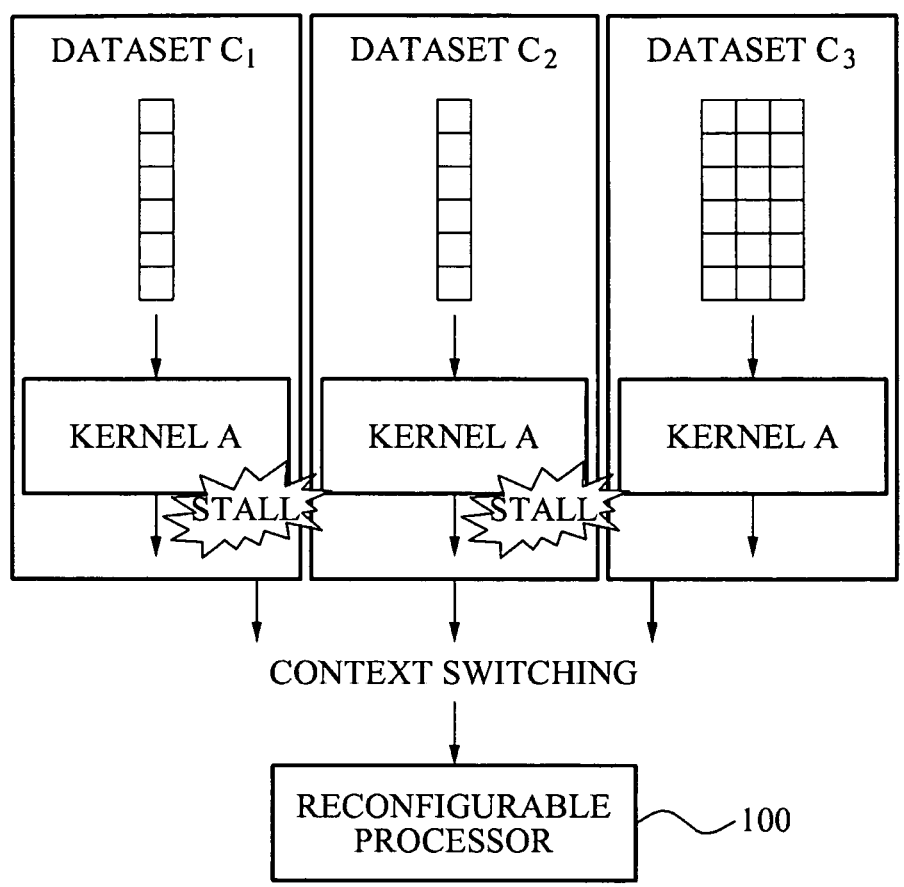
FIG. 8 is a diagram illustrating a thread model for performing multi-threading of a single kernel, according to one or more embodiments.

FIG. 7 illustrates a thread model to perform multi-threading of a multiple kernel, according to one or more embodiments, and FIG. 8 is a diagram illustrating a thread model for performing multi-threading of a single Kernel, according to one or more embodiments.

First, a thread will be briefly described as follows. When an enormous amount of an input dataset exists, a Kernel function may process all the input data set by performing an iterative operation in a loop. In the process, the iterative operation of the loop may be mapped to a plurality of FUs, and the iterative operation may be performed in parallel, thereby enabling acceleration of the loop. When a single input dataset is given to a single kernel function, the kernel function is called, and thus, a single kernel instance occurs. A single kernel instance is known as a thread.

One or more embodiments may define the kernel instance as a thread that is a basic unit of multi-threading. In an embodiment, the thread may be generated when a compiler performs compiling of a program with machine code instructions that are understood by the reconfigurable processor 100, and a plurality of threads may be generated. As noted, when the plurality of threads are generated, a thread identification TID may be assigned to each thread. The thread ID may be expressed as TID1, TID2, . . . , TIDn.

Referring to FIG. 7, the kernel may indicate that a program corresponding to the loop is compiled in a form to be executed in the configuration array mode, as an example, a CGA mode, to perform the loop quickly. Accordingly, a kernel may be assigned per loop, and a single loop is corresponding to a single thread. In FIG. 7, each of dataset A and dataset B is an input dataset for a corresponding loop. Dataset A is input to a kernel A and dataset B is input to a kernel B.

A user program may simultaneously launch a plurality of kernel functions, such as kernel A and kernel B, which are capable of being simultaneously performed. In an embodiment, the plurality of kernel functions may be asynchronously called and a kernel instance of the called kernel function may wait to be actually executed in a queue. In other words, the reconfigurable processor 100 may perform one of a plurality of kernel instances in the queue, first. When a stall occurs after the execution is requested or during the execution, the reconfigurable processor 100 may perform context switching by selecting another kernel instance. As an example, the reconfigurable processor 100 may perform context switching to the kernel B from the kernel A.

A kernel instance of which execution is completed may be input to another queue. A user application may check the other queue at a desired point in time, and may check whether the execution of the kernel instance is completed and may check a desired result.

A thread model for multi-threading of multiple kernels will be described based on an example as below. When two loops exist in a complied program, the loops may be complied into kernel A and kernel B, respectively, and each of the loops may be a single thread. In other words, as illustrated in FIG. 7, a loop having the input dataset A may be defined as a thread and may be input into kernel A, and a loop having the input dataset B may be defined as another single thread and may be input into kernel B. The reconfigurable processor 100 or the controlling unit 620 may load configuration information and a register corresponding to kernel A and configuration information and a register corresponding to kernel B to a corresponding area among divided areas of the configuration memory 120, the global register file 130, or the one or more local RFs.

When a stall occurs after the reconfigurable processor 100 commands execution of kernel A, the reconfigurable processor 100 may command the controlling unit 620 to execute kernel B. In other words, the controlling unit 620 may provide an ID of kernel B, namely, a TID. Accordingly, the reconfigurable processor 100 may perform execution of kernel B by using an area that is already mapped to the TID, among areas of the counter 110, the global register file 130, and one or more of the local RFs.

Referring to FIG. 8, the user program may call a single Kernel function at a time, and may not call another function until the called Kernel function is completed. Also, in a case of a loop statement, a number of iterations may be set based on a size of a given dataset when the Kernel function is called. Accordingly, the compiler may divide the loop into a plurality of loops to compile the divided loops, and may set the respective compiled loops as different kernel instances from each other and may register the different kernel instances in the queue.

Referring to FIG. 8, although the input dataset is divided into three data sets, such as dataset $C_1$, dataset $C_2$, and dataset $C_3$, all the divided data sets are input into the same kernel A. This may indicate that although there is a single actual loop code, three threads are defined and each of the threads may have a corresponding ID. In addition, the counter 110, the global register file 130, and the one or more local RFs may be divided to be corresponding to IDs of the divided plurality of threads, respectively.

The reconfigurable processor 100 may then perform one of the plurality of kernel instances that are in standby in the queue, for example, a kernel instance corresponding to the dataset $C_1$. When a stall occurs during the execution of the kernel instance, the controlling unit 620 may select another kernel instance, as an example, a kernel instance corresponding to a dataset $C_2$, and may perform context switching. Accordingly, the reconfigurable processor 100 may execute a thread corresponding to the other kernel instance by using information that is already loaded to each register, without using an additional cycle.

Counter 110, the global register file 130 and one or more local RFs will be differently divided based on the thread model for the context switching that is described with reference to FIGS. 7 and 8, for example.

Figure 9:
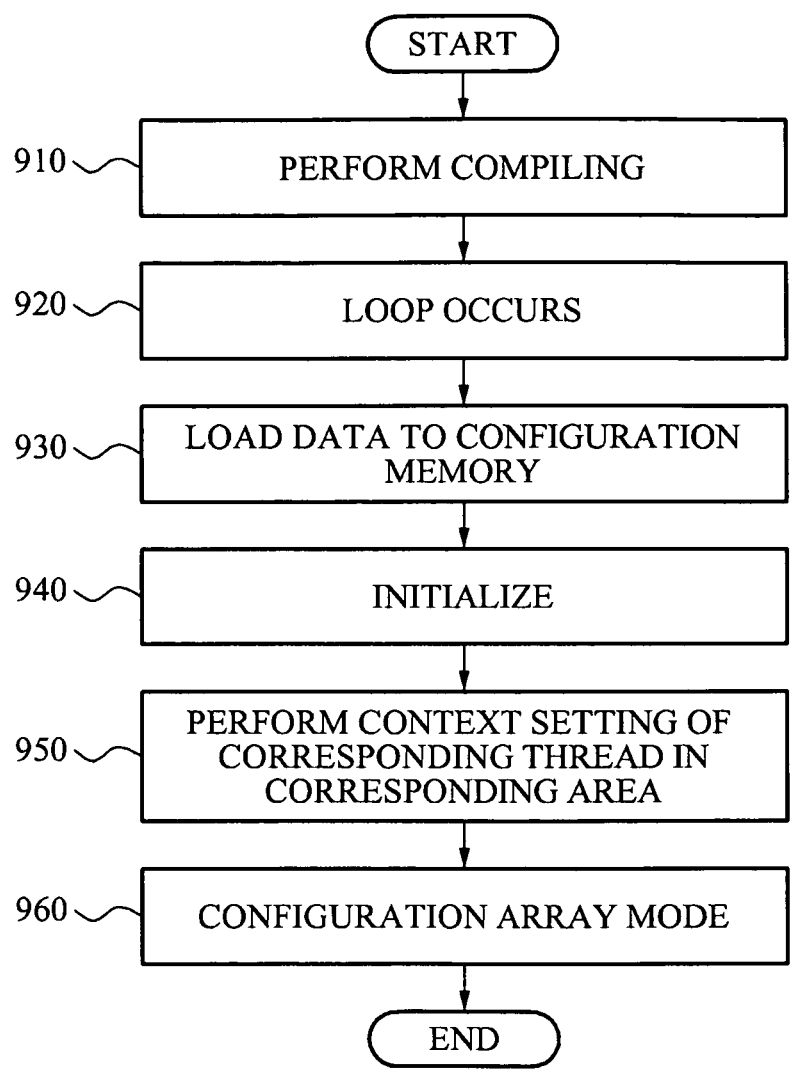
FIG. 9 is a flowchart illustrating a context-setting that uses areas divided in advance, according one or more embodiments.

FIG. 9 is a flowchart illustrating a context-setting that uses areas divided in advance, according to one or more embodiments.

Referring to FIG. 9, a compiler compiles a program source code including a loop that is capable of being CGA kernelized, and may generate at least one thread, a configuration code, a thread launch stub code, an instruction code, and BSS data in operation 910.

When it is determined that a loop occurs as a result of the compiling in operation 920, the controlling unit 620 may load, to the configuration memory 120 data such as the configuration code, namely information about configuration.

In operation 940, the controlling unit 620 may execute a code such as the thread launch stub code, and may initialize the thread status register 610.

In operation 950, the controlling unit 620 may execute the code such as the thread launch stub code, and may set a context of a corresponding thread to each of the areas divided during a manufacturing process in advance. That is, the controlling unit 620 may set a context of a corresponding thread for each area of divided areas of the global register file 130 and the one or more local RFs. As an example, the controlling unit 620 may store, in the register file 130 and the one or more local RFs, a loop variable and a register value used in each thread as an initial value of each thread.

In operation 960, the controlling unit 620 may begin a configuration array mode, as an example, a CGA kernel mode that executes a CGA kernel.

Figure 10:
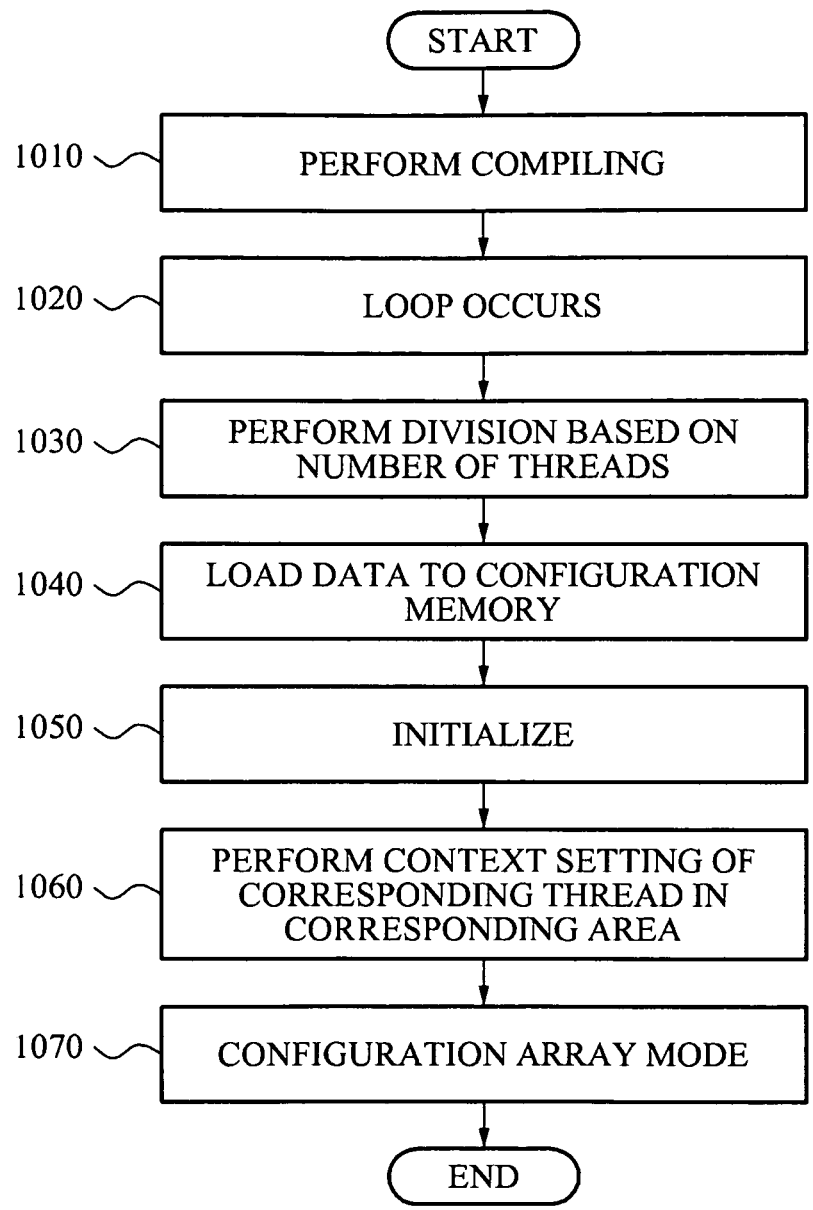
FIG. 10 is a flowchart illustrating a process of performing a context-setting after dividing an area based on a generated thread, according to one or more embodiments.

FIG. 10 is a flowchart illustrating a process of performing a context-setting after dividing an area based on a generated thread, according to one or more embodiments.

Referring to FIG. 10, a compiler compiles a program source code including a loop that is capable of being CGA kernelized, and may generate at least one thread, a configuration code, a thread launch stub code, an instruction code, and BSS data, for example.

When it is determined that a loop occurs as a result of the compiling in operation 1020, the controlling unit 620 may divide an area of the counter 110, the global register file 130, and one or more local RFs into a plurality of areas, e.g., with a number of the areas of the plurality of areas being the same as the number of threads. In this instance, the controlling unit 620 may divide the area of the counter 110, the global register file 130, and the one or more local RFs into the plurality of divided areas, again, the sizes of which may be proportional to corresponding threads.

In operation 1040, the controlling unit 620 may load, to the configuration memory 120, data such as a configuration code, namely, information about a configuration.

In operation 1050, the controlling unit 620 may execute a code such as the thread launch stub code and may initialize the thread status register 610.

In operation 1060, the controlling unit 620 may execute the code such as the thread launch stub code, and may set the divided areas of operation 1030 to be mapped to corresponding threads, respectively. That is, the controlling unit 620 may load context information of a corresponding thread for each of the divided areas of the global register file 130 and one or more local RFs, and may assign a corresponding ID to each thread.

In operation 1070, the controlling unit 620 may enter a configuration array mode, as an example a CGA kernel mode that executes a CGA kernel.

Figure 11:
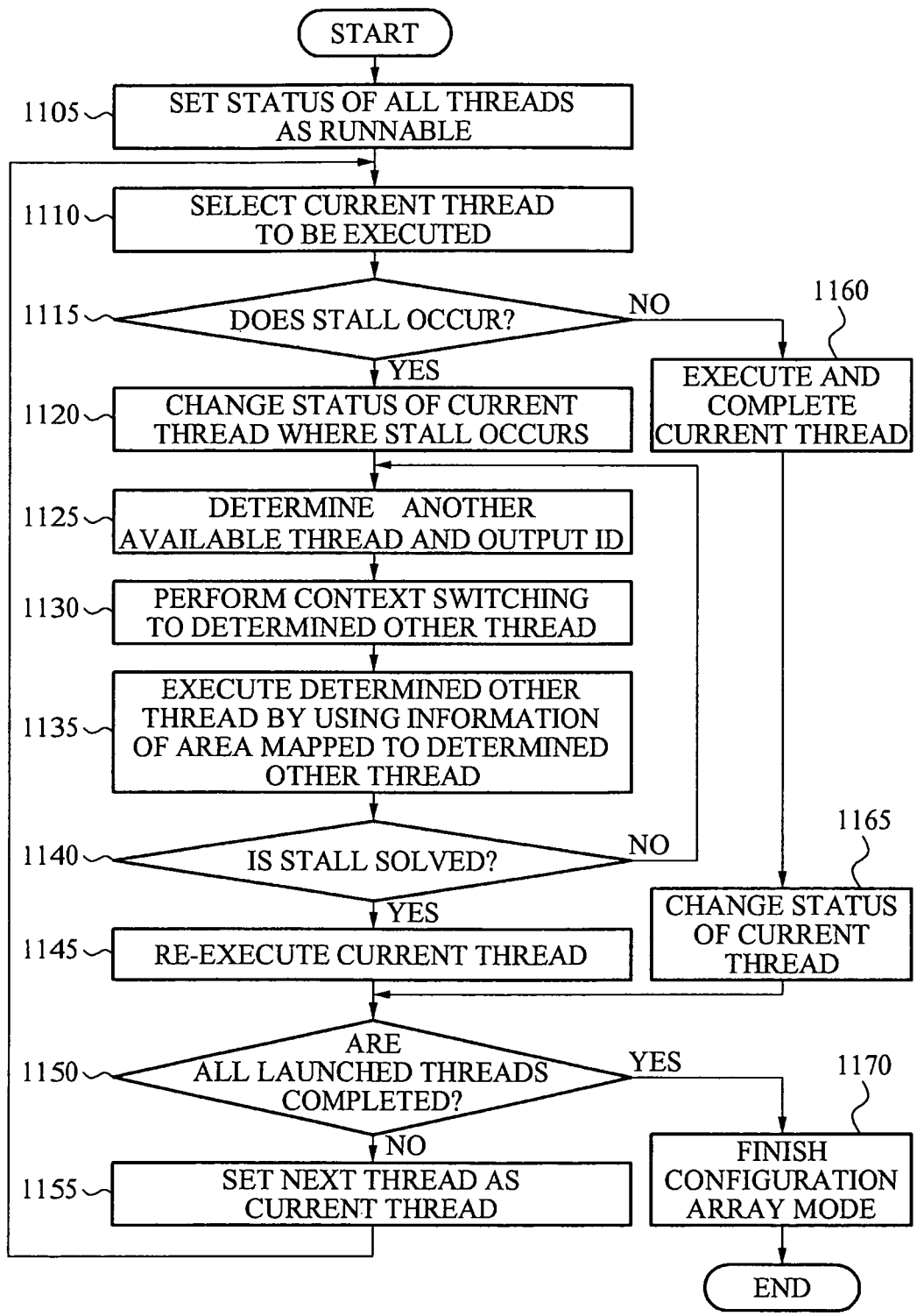
FIG. 11 is a flowchart illustrating a data process method, according to one or more embodiments.

FIG. 11 is a flowchart illustrating a data process method, according to one or more embodiments FIG. 11 illustrates a data processing method in a configuration array mode by operation 960 of FIG. 9 or by operation 1070 of FIG. 10, for example. When the configuration array mode begins, the controlling unit 620 may set a status of all threads to a runnable status in operation 1105.

In operation 1110, the controlling unit 620 may select a thread to be currently executed from among a plurality of threads, and may command execution thereof. That is, the controlling unit 620 may provide identification information of the thread to be currently executed, to the reconfigurable processor 100.

When it is determined that a stall occurs during the execution of the selected thread or before the execution in operation 1115, the controlling unit 620 may change a status of the current thread set in the thread status register 610 into "stall status".

In operation 1125, the controlling unit 620 may check the thread status register 610 to determine another thread from among available threads of which status is set as "runnable", and may output an ID of the determined other thread to the counter 110 and the adders 40a and 50a.

In operation 1130, the controlling unit 620 may command context switching to the other thread determined in operation 1125, and may provide the identification information of the other thread to the reconfigurable processor 100.

In operation 1135, the reconfigurable processor 100 may access an area that is mapped to the other thread and may execute the other thread by using the context information stored in the accessed area. As an example, when the other thread determined in operation 1125 is a second thread, the counter 110 of the reconfigurable processor 100 may count a cycle in a counter of $C_{TID2}$ corresponding to a TID2. Also, the global register file 130 may access an area $L_{TID2}$ corresponding to the TID2, and may provide, to the configuration array 140, context information that is loaded to the accessed area $L_{TID2}$ in advance. Also, an FU may execute the second thread by using the context information corresponding to the second thread, and a corresponding local RF may store an output value of the second thread to the area $L_{TID2}$ corresponding to the TID2.

When the stall occurring in operation 1140 is solved or ceases in operation 1115, the stall may be released and the controlling unit 620 may control the reconfigurable processor 100 to re-execute the current thread where the stall occurs, in operation 1145. When the re-execution of the current thread is completed, the controlling unit 620 may change a status of the current thread into "complete status", thereby updating the status of the current thread in the thread status register 610.

In operation 1150, the controlling unit 620 may check the thread status register 610 to determine whether there are remaining threads to be executed. The controlling unit 620 may determine that a thread of which status is "runnable" as the thread to be executed.

In operation 1155, the controlling unit 620 may set a next thread to be executed as a current thread, and may proceed with operation 1110.

When a stall does not occur with respect to the current thread in operation 1115, the controlling unit 620 may execute the current thread and may complete the execution in operation 1160.

In operation 1165, the controlling unit 620 may change a status of the current thread of which execution is completed into "complete status", and may proceed with operation 1150.

Also, in operation 1150, when execution of all launched threads is completed, the controlling unit 620 may exit the configuration array mode.

Figure 12:
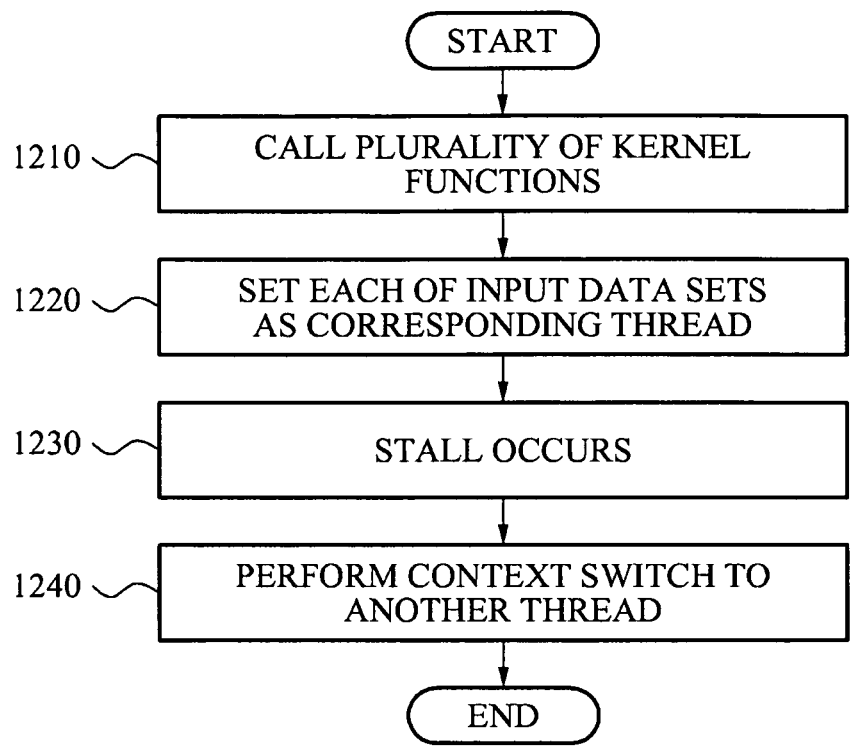
FIGS. 12 and 13 are flowcharts illustrating thread modeling methods for multi-threading, according to one or more embodiments.

FIG. 12 is flowchart illustrating a thread modeling method for multi-threading, according to one or more embodiments.

Referring to FIGS. 7 and 12, a user program may call at least two compiled kernel functions in operation 1210.

In operation 1220, input datasets of a plurality of kernel functions may be set as threads, respectively. Therefore, a plurality of threads may be generated. Each of the input datasets, which may be constituted of a loop statement, may be set as a thread by a compiler.

When a stall occurs in a thread to be executed or in a thread being executed among the plurality of threads in operation 1230, the reconfigurable processor 100 may execute another thread by performing context switching to the other thread, in operation 1240.

Figure 13:
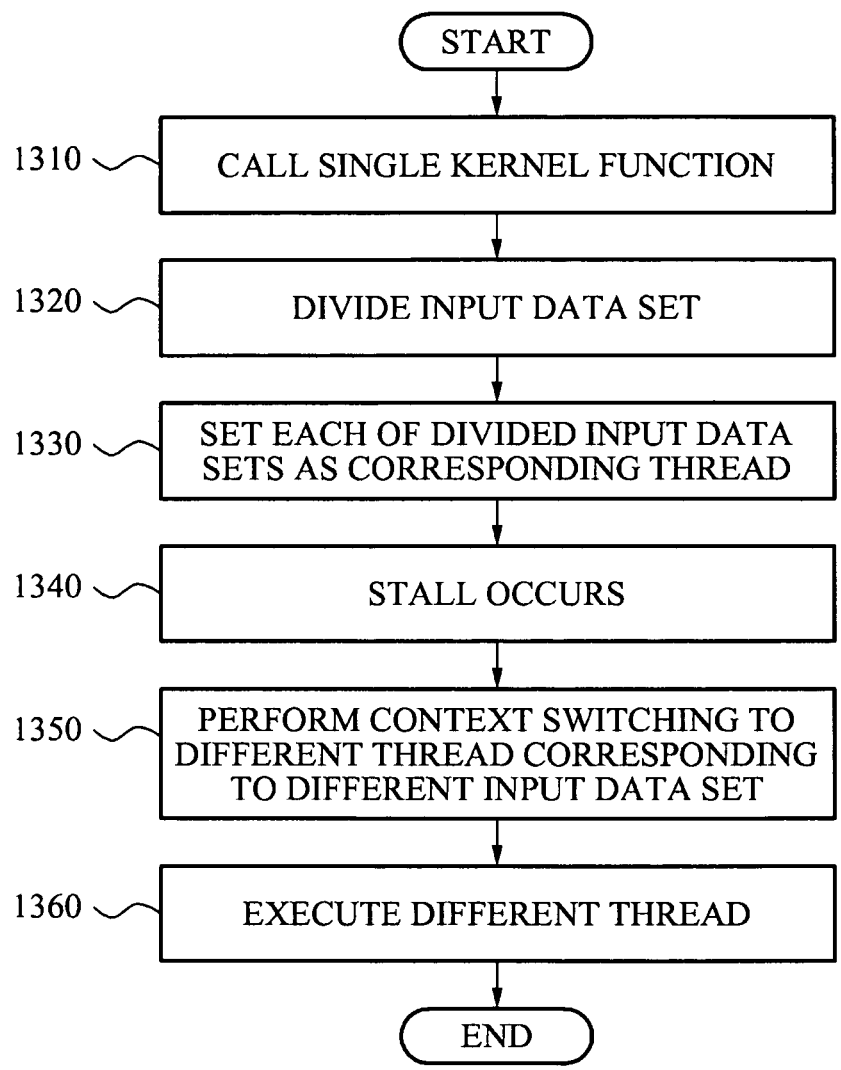

FIG. 13 is flowchart illustrating a thread modeling method for multi-threading, according to one or more embodiments.

Referring to FIGS. 8 and 13, in operation 1310, the user program may call one kernel function of a plurality of compiled kernel functions.

In operation 1320, an input dataset corresponding to the one kernel function may be divided into a plurality of input datasets.

In operation 1330, the plurality of input datasets generated by the division may be set as threads, respectively. Each of the input datasets, which may be constituted of a loop statement, may be set as a thread by a compiler, for example.

When a stall occurs in a thread to be executed or a thread being executed in operation 1340, the reconfigurable processor 100 may perform context-switching to another thread in operation 1350, and may execute the other thread in operation 1360.

One or more embodiments may also be implemented through computer readable code/instructions in/on a non-transitory medium, e.g., a computer readable medium, to control at least one processing element to implement one or more embodiments. The medium can correspond to non-transitory medium/media permitting the storing or transmission of the computer readable code.

The media may also include, e.g., in combination with the computer readable code, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of computer readable code include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

In addition to the above described embodiments, one or more embodiments can also be implemented as hardware, e.g., at least one hardware based processing unit including at least one processor capable of implementing one or more processes of one or more embodiments.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A reconfigurable processor comprising:
a plurality of memories divided into a plurality of different areas, the different divided areas corresponding to respective different threads from a plurality of threads and with sizes proportional to the respective different threads, with corresponding areas of the different divided areas storing context information of the respective different threads; and
a plurality of function units to perform a corresponding calculation based on received context information stored in an area, from the different divided areas, corresponding to a respective thread indicated to be executed,
wherein the plurality of memories include a plurality of local register files each divided into a plurality of local register file areas, where each local register file area of a local register file is respectively configured to collectively store information for different threads from a particular function unit configured to execute the different threads, with the particular function unit being paired with the local register file distinguished from a different particular function unit paired with a different local register file, and
wherein the plurality of memories receive identification information of the respective thread to be executed and make available to the plurality of function units the area, the area being mapped to the identification information.

2. The reconfigurable processor of claim 1, wherein the plurality of function units perform the calculation by using the context information stored in the area, as mapped to by the identification information, upon receiving the identification information of the respective thread to be executed.

3. The reconfigurable processor of claim 1, wherein the plurality of function units stop execution of the respective thread, and perform another calculation by using context information stored in a different area, from different divided areas of a corresponding paired local register file, being mapped to by identification information of a different thread, when receiving the identification information of the different thread.

4. The reconfigurable processor of claim 1, further comprising:
a counter divided into a plurality of counter areas corresponding to the plurality of threads, to perform counting in each counter area corresponding to a thread being executed; and
a configuration memory to provide information about a configuration enabling execution of the thread being executed to the plurality of function units, based on a result of the counting.

5. The reconfigurable processor of claim 1, wherein a number of the plurality of different areas is adjustable based on a number of the respective different threads.

6. The reconfigurable processor of claim 1, wherein the plurality of memories further include a global register file, separate from the plurality of local register files, to store output information of different threads having been performed by at least one of the plurality of function units.

7. The reconfigurable processor of claim 6, wherein the plurality of function units and the plurality of local register files are part of a configuration array, distinguished from the global register file, controllable to represent different configurations of processing elements.

8. A reconfigurable processor comprising:
a plurality of memories divided into a plurality of different areas, the different divided areas corresponding to respective different threads from a plurality of threads and with sizes proportional to the respective different threads, with corresponding areas of the different divided areas storing context information of the respective different threads; and
a plurality of function units to perform a corresponding calculation based on received context information stored in an area, from the different divided areas, corresponding to a respective thread indicated to be executed,
wherein the plurality of memories comprise:
at least one global register file divided into a plurality of global register file areas corresponding to the respective different threads from the plurality of threads, to provide, to the plurality of function units, an input value loaded to an area of the plurality of divided global register file areas corresponding to the respective thread to be executed; and a plurality of local register files each divided into a plurality of local register file areas corresponding to the respective different threads from the plurality of threads, to each store, in a respective area of each of the plurality of divided local register file areas corresponding to the respective thread to be executed, a respective output value of a calculation performed by a respective function unit, and wherein the plurality of memories receive identification information of the respective thread to be executed and make available to the plurality of function units the area, the area being mapped to the identification information.

9. The reconfigurable processor of claim 8, wherein the plurality of function units and the plurality of local register files are part of a configuration array, distinguished from the global register file, controllable to represent different configurations of processing elements, and the configuration array is distinguished from the global register file.

10. A reconfiguration control apparatus comprising:
a reconfigurable processor having a plurality of memories divided into a plurality of different areas, the different divided areas corresponding to respective different threads from a plurality of threads and with sizes proportional to the respective different threads, and to store context information of the respective different threads in corresponding areas of the different divided areas; and
a controlling unit to control a storing of the context information of the respective different threads in the corresponding different divided areas,
wherein the plurality of memories include a plurality of local register files each divided into a plurality of local register file areas, where each local register file area of a local register file is respectively configured to collectively store information for different threads from a particular function unit of the reconfigurable processor configured to execute the different threads, with the particular function unit being paired with the local register file distinguished from a different particular function unit of the reconfigurable processor paired with a different local register file, and
wherein the plurality of memories receive identification information of the respective thread to be executed and make available to the plurality of function units the area, the area being mapped to the identification information.

11. The reconfiguration control apparatus of claim 10, wherein:
the controlling unit provides, to the reconfigurable processor, identification information of a thread to be currently executed from among the respective different threads; and
the reconfigurable processor accesses an area, from different divided areas of a corresponding paired local register file, corresponding to the provided identification information, and executes the thread by using context information stored in the accessed area.

12. The reconfiguration control apparatus of claim 11, wherein:
the controlling unit commands context switching to another available thread, represented by another area of the different divided areas of the corresponding paired local register file, and to provide identification information of the other thread to the reconfigurable processor, upon a stall occurring with respect to the thread to be currently executed; and
the reconfigurable processor accesses the other area corresponding to the identification information of the other thread, and executes the other thread by using context information stored in the accessed other area of the corresponding paired local register file for the other thread.

13. The reconfiguration control apparatus of claim 10, further comprising:
a thread status register to store a status of each of the respective different threads, wherein the controlling unit updates the status of each of the respective different threads,
the status of each of the respective different threads indicating whether the thread is in a status where a stall occurs, a status where the stall is released, a status where execution of the thread is available, and a status where execution of the thread is completed.

14. The reconfiguration control apparatus of claim 10, wherein the reconfigurable processor comprises:
the plurality of memories, divided into the different divided areas, storing context information of the respective different threads in corresponding areas of the different divided areas; and
the plurality of function units to perform a corresponding calculation based on received context information stored in an area, from the different divided areas, corresponding to a thread to be currently executed.

15. The reconfiguration control apparatus of claim 10, wherein the plurality of memories further include a global register file, separate from the plurality of local register files, to store output information of different threads having been performed by at least one of the plurality of function units.

16. The reconfiguration control apparatus of claim 15, wherein the reconfigurable processor further comprises a configuration array, distinguished from the global register, representing differently configurable processing elements, the configuration array including the plurality of function units and plurality of local register files.

17. A reconfiguration control method comprising:
dividing a plurality of memories included in a reconfigurable processor into a plurality of different divided areas corresponding to respective different threads from a plurality of threads and with sizes proportional to the respective different threads; and
storing context information of the respective different threads in corresponding areas of the different divided areas,
wherein the plurality of memories include a plurality of local register files each divided into a plurality of local register file areas, where each local register file area of a local register file is respectively configured to collectively store information for different threads from a particular function unit of a reconfigurable processor configured to execute the different threads, with the particular function unit being paired with the local register file distinguished from a different particular function unit of the reconfigurable processor paired with a different local register file, and
wherein the plurality of memories receive identification information of the respective thread to be executed and make available to the plurality of function units the area the area being mapped to the identification information.

18. The reconfiguration control method of claim 17, further comprising:
  providing, to the reconfigurable processor, identification information of a thread to be currently executed from among the respective different threads;
  accessing an area, from the different divided areas, corresponding to the provided identification information; and
  executing the thread by using context information stored in the accessed area.

19. The reconfiguration control method of claim 18, further comprising:
  commanding a context switch to another available thread, represented by another area of the different divided areas, and providing identification information of the other thread to the reconfigurable processor upon a stall occurring with respect to the thread to be currently executed;
  accessing the other area corresponding to the identification information of the other thread; and
  executing the other thread by using context information stored in the accessed other area for the other thread.

20. The reconfiguration control method of claim 19, further comprising:
  changing a status, from plural stored statuses of each of the respective different threads, of the thread to be currently executed upon the stall occurring or being released.

21. A non-transitory computer readable receding medium comprising computer readable code to control at least one processing device to implement the method of claim 17.

22. The reconfiguration control method of claim 17, wherein the plurality of memories further include a global register file to store output information of different threads having been performed by at least one of the plurality of function units.

23. The reconfiguration control method of claim 22, wherein plural paired function units and corresponding local register files are in a configuration array, of the reconfigurable processor, representing differently configurable processing elements, the configuration array being distinguished from the global register file.

24. A thread modeling method comprising:
  calling a plurality of Kernel functions, and setting input datasets corresponding to the plurality of Kernel functions as respective threads, respectively;
  performing context switching from a thread of the respective threads currently set to be executed to another thread of the respective threads, while maintaining a local register file of each of plural respectively paired function units respectively configured to execute the respective threads and with sizes proportional to the respective threads, and executing the other thread upon a stall occurring with respect to the thread of the respective threads currently set to be executed; and
  maintaining a global register file separate from the local register file,
  wherein each local register file is configured to maintain, upon the stall, collective storage of information for different threads from a respectively paired function unit, of the plural function units, configured to execute the different threads in different divided areas of each local register file, with each divided area being mapped to a different thread, and
  wherein the local resister files receive identification information of the respective thread to be executed and make available to the plurality of function units the area, the area being mapped to the identification information.

25. The thread modeling method of claim 24, further comprising storing, in a global register file, information of different threads having been performed by at least one of the plurality of function units.

26. The thread modeling method of claim 25, wherein plural paired function units and corresponding local register files are in a configuration array representing differently configurable processing elements, the configuration array being distinguished from the global register file.

27. The thread modeling method of claim 25, wherein the setting of the input datasets includes storing the input data sets in different areas of the global register respectively file mapped to different threads.

28. A thread modeling method comprising:
  calling a Kernel function, and dividing input datasets corresponding to the called Kernel function;
  setting the divided input datasets as respective threads;
  performing context switching from a thread of the respective threads currently set to be executed to another thread of the respective threads, while maintaining a local register file of each of plural respectively paired function units respectively configured to execute the respective threads and with sizes proportional to the respective threads, corresponding to an input dataset of the divided input datasets different from an input dataset set as the thread currently set to be executed, and executing the other thread upon a stall occurring with respect to the thread of the respective threads currently set to be executed,
  wherein each local register file is configured to maintain, upon the stall, collective storage of information for different threads from a respectively paired function unit, of the plural function units, configured to execute the different threads in different divided areas of each local register file, with each divided area being mapped to a different thread, and
  wherein the local register files receive identification information of the respective thread to be executed and make available to the plurality of function units the area the area being mapped to the identification information.

29. The thread modeling method of claim 28, further comprising storing, in a global register file, information of different threads having been performed by at least one of the plurality of function units of the at least one processor.

30. The thread modeling method of claim 29, wherein plural paired function units and corresponding local register files are in a configuration array representing differently configurable processing elements, the configuration array being distinguished from the global register file.

31. The thread modeling method of claim 29, wherein the setting of the divided input datasets includes storing each of the divided input data sets in different divided areas of the global register file, wherein each the divided areas of the global register file is mapped to a different thread.

* * * * *